(12) United States Patent
Yamahara

(10) Patent No.: US 9,414,014 B2
(45) Date of Patent: Aug. 9, 2016

(54) COMMUNICATION CONTROL SYSTEM, COMMUNICATION CONTROL METHOD, COMMUNICATION CONTROL PROGRAM, TERMINAL, AND PROGRAM FOR TERMINAL

(71) Applicant: Rakuten, Inc., Shinagawa-ku, Tokyo (JP)

(72) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/375,686

(22) PCT Filed: Mar. 29, 2013

(86) PCT No.: PCT/JP2013/059636
§ 371 (c)(1),
(2) Date: Jul. 30, 2014

(87) PCT Pub. No.: WO2014/155710
PCT Pub. Date: Oct. 2, 2014

(65) Prior Publication Data
US 2016/0105637 A1    Apr. 14, 2016

(51) Int. Cl.
*H04N 7/15* (2006.01)
*H04N 7/14* (2006.01)
*H04W 88/04* (2009.01)

(52) U.S. Cl.
CPC .............. *H04N 7/147* (2013.01); *H04W 88/04* (2013.01)

(58) Field of Classification Search
CPC .............................. H04N 7/147; H04W 88/04
USPC ...................................................... 348/14.07
See application file for complete search history.

(56) References Cited

U.S. PATENT DOCUMENTS 5,065,147 A * 11/1991 Rice .................... G01R 13/0227
                                                        324/121 R
6,088,064 A *  7/2000 Rumreich ................ H04N 5/45
                                                        348/468
6,163,803 A * 12/2000 Watanabe ............. G10L 19/018
                                                        704/E19.039

(Continued)

FOREIGN PATENT DOCUMENTS

JP      2002-27463 A     1/2002
JP     2007-300232 A    11/2007

(Continued)

OTHER PUBLICATIONS

Communication issued from the International Searching Authority dated Apr. 23, 2013 in counterpart International Application No. PCT/JP2013/059636.

(Continued)

*Primary Examiner* — Creighton Smith
(74) *Attorney, Agent, or Firm* — Sughrue Mion, PLLC

(57) ABSTRACT

Provided is a communication control system that controls communication between a transmitting terminal and a receiving terminal, including a signal transmitting unit that transmits a transmission signal being a voice signal or a video signal from the transmitting terminal to the receiving terminal, an acquisition unit that acquires response information specifying an arrival signal being a signal received by the receiving terminal among the transmission signal from the receiving terminal, a specifying unit that specifies the arrival signal or a lost signal being a signal not received by the receiving terminal among the transmission signal based on the transmission signal and the response information, and a display unit that displays reception status identification information capable of identifying the arrival signal or the lost signal on the transmitting terminal.

20 Claims, 8 Drawing Sheets

(56) References Cited

U.S. PATENT DOCUMENTS

| | | | |
|---|---|---|---|
| 6,496,873 B1 * | 12/2002 | Brunet | G06F 3/16 710/260 |
| 7,079,582 B2 | 7/2006 | Imura et al. | |
| 2002/0136307 A1 | 9/2002 | Imura et al. | |
| 2004/0080399 A1 * | 4/2004 | Foster | G06Q 30/02 340/286.09 |
| 2005/0046548 A1 * | 3/2005 | Foster | G06Q 30/02 340/286.09 |

FOREIGN PATENT DOCUMENTS

| | | |
|---|---|---|
| JP | 2011-10105 A | 1/2011 |
| JP | 2011-120168 A | 6/2011 |

OTHER PUBLICATIONS

International Search Report for PCT/JP2013/059636 dated Apr. 23, 2013 [PCT/ISA/210].

* cited by examiner

*Fig.8*

- COMMUNICATION CONTROL PROGRAM, PROGRAM FOR TERMINAL ~P1
  - MAIN MODULE ~P2
  - INPUT MODULE ~P3
  - SIGNAL TRANSMITTING MODULE ~P4
  - STORING MODULE ~P5
  - MEMORY MODULE ~P6
  - RECEIVING MODULE ~P7
  - RESPONSE MODULE ~P8
  - RESPONSE INFORMATION ACQUISITION MODULE ~P9
  - COMPARISON MODULE ~P10
  - DISPLAY MODULE ~P11
  - VOICE OUTPUT MODULE ~P12

COMMUNICATION CONTROL SYSTEM, COMMUNICATION CONTROL METHOD, COMMUNICATION CONTROL PROGRAM, TERMINAL, AND PROGRAM FOR TERMINAL

CROSS REFERENCE TO RELATED APPLICATIONS

This application is a National Stage of International Application No. PCT/JP2013/059636, filed on Mar. 29, 2013, the contents of which is incorporated herein by reference in its entirety.

TECHNICAL FIELD

One aspect of the present invention relates to a communication control system, a communication control method, a communication control program, a terminal, and a program for a terminal.

BACKGROUND ART

A communication control system that implements communications by transmitting voice signals or video signals from a transmitting terminal to a receiving terminal through a communication line has been provided. However, depending on communication conditions, there is a case where a part or the whole of the voice signal or the video signal is lost in the communication line between the transmitting terminal and the receiving terminal, and the voice signal or the video signal does not reach the receiving terminal.

As a system to give a notification about a communication failure between the transmitting terminal and the receiving terminal to a user, the communication system disclosed in Patent Literature 1, for example, is known. The communication system is composed of a base station including a reception monitoring unit that monitors radio wave reception, an abnormal condition monitoring unit that monitors the abnormality of the base station and a message transmitting and receiving unit that transmits the abnormality of radio waves or the abnormality of the base station as a message and relays a message from a portable terminal, and a terminal including a reception monitoring unit that monitors radio wave reception, an abnormal condition monitoring unit that monitors the abnormality of the terminal, a message transmitting and receiving unit that transmits the abnormality of radio waves or/and the abnormality of the terminal as a message and receives a message from the base station and an audio processing unit that converts a message into audio and outputs it. When a failure such as disconnection of a call occurs, this communication system transmits a message indicating that the cause of the failure is one of radio wave interference, the abnormality of the terminal and the abnormality of the base station to the terminal and thereby allows a user to recognize the reason for the failure.

CITATION LIST

Patent Literature

Patent Literature 1: Japanese Unexamined Patent Application Publication No. 2007-300232

SUMMARY OF INVENTION

Technical Problem

In the case where a part of the voice or video is interrupted at the receiving terminal due to a partial loss of the transmission signal between the transmitting terminal and the receiving terminal, a user of the transmitting terminal needs to deal with this by retransmitting the lost part of voice or video, for example. However, in the system disclosed in Patent Literature 1, a user of the transmitting terminal cannot grasp which part of the transmitted voice or video has reached the receiving terminal, which can hinder smooth communication between the user of the transmitting terminal and a user of the receiving terminal.

Accordingly, there is a demand for a communication control system that allows smooth communication between a user of a transmitting terminal and a user of a receiving terminal.

Solution to Problem

The communication control system according to one aspect of the invention is a communication control system that controls communication between a transmitting terminal and a receiving terminal, including a signal transmitting unit configured to transmit a transmission signal being a voice signal or a video signal from the transmitting terminal to the receiving terminal, an acquisition unit configured to acquire response information specifying an arrival signal being a signal received by the receiving terminal among the transmission signal from the receiving terminal, a specifying unit configured to specify the arrival signal or a lost signal being a signal not received by the receiving terminal among the transmission signal based on the transmission signal and the response information, and a display unit configured to display reception status identification information capable of identifying the arrival signal or the lost signal on the transmitting terminal.

In this communication control system, the arrival signal or the lost signal is specified based on the transmission signal and the response information, and the reception status identification information capable of identifying the arrival signal or the lost signal is displayed on the display unit of the transmitting terminal. Therefore, a user of the transmitting terminal can grasp how the transmitted voice signal or video signal has been recognized by a user of the receiving terminal. Therefore, according to this communication control system, it is possible to ensure smooth communication between a user of the transmitting terminal and a user of the receiving terminal.

The communication control system according to another aspect may further include a voice recognition processing unit configured to convert the voice signal contained in the transmitting terminal into a character string by voice recognition processing, and the display unit may display the character string in association with the reception status identification information.

In the communication control system according to another aspect, the specifying unit may specify an arrival video signal being a video signal received by the receiving terminal among the video signal transmitted from the transmitting terminal based on the video signal contained in the transmission signal transmitted from the transmitting terminal and the response information, and the display unit may display frame images generated from the arrival video signal on the display unit.

The communication control system according to another aspect may further include a time acquisition unit configured to acquire a time indicated by a user of the transmitting terminal, and the display unit may display a frame image of the video signal corresponding to the time acquired by the time acquisition unit.

The communication control system according to another aspect may further include a retransmitting unit configured to retransmit the lost signal to the second terminal in response to a request from a user of the transmitting terminal.

The communication control system according to another aspect may further include an importance calculation unit configured to calculate a level of importance of the lost signal, and the retransmitting unit may not retransmit the lost signal to the second terminal when the level of importance is lower than a reference value.

In the communication control system according to another aspect, the retransmitting unit may set a specified section including the lost signal to the transmission signal based on the lost signal or the transmission signal, and retransmit the signal within the specified section to the receiving terminal.

In the communication control system according to another aspect, the retransmitting unit may transmit the lost signal converted into a character string by voice recognition processing to the second terminal.

A communication control method according to one aspect of the invention is a communication control method by a communication control system that controls communication between a transmitting terminal and a receiving terminal, the method including a signal transmitting step of transmitting a transmission signal being a voice signal or a video signal from the transmitting terminal to the receiving terminal, an acquisition step of acquiring response information specifying an arrival signal being a signal received by the receiving terminal among the transmission signal from the receiving terminal, a specifying step of specifying the arrival signal or a lost signal being a signal received by the receiving terminal among the transmission signal based on the transmission signal and the response information, and a display step of displaying reception status identification information capable of identifying the arrival signal or the lost signal on the transmitting terminal.

A communication control program according to one aspect of the invention is a communication control program that controls communication between a transmitting terminal and a receiving terminal, the program causing a computer to function as a signal transmitting unit to transmit a transmission signal being a voice signal or a video signal from the transmitting terminal to the receiving terminal, an acquisition unit to acquire response information specifying an arrival signal being a signal received by the receiving terminal among the transmission signal from the receiving terminal, a specifying unit to specify the arrival signal or a lost signal being a signal not received by the receiving terminal among the transmission signal based on the transmission signal and the response information, and a display unit to display reception status identification information capable of identifying the arrival signal or the lost signal on the transmitting terminal.

A terminal according to one aspect of the invention includes a signal transmitting unit configured to transmit a transmission signal being a voice signal or a video signal to an other terminal, an acquisition unit configured to acquire response information specifying an arrival signal being a signal received by the other terminal among the transmission signal from the other terminal, a specifying unit configured to specify the arrival signal or a lost signal being a signal not received by the other terminal among the transmission signal based on the transmission signal and the response information, a display unit configured to display reception status identification information capable of identifying the arrival signal or the lost signal, and a response unit configured to transmit another response information specifying a voice signal or a video signal received from the other terminal to the other terminal.

In this terminal, the arrival signal or the lost signal is specified based on the transmission signal and the response information, and the reception status identification information capable of identifying the arrival signal or the lost signal is displayed on the display unit of the terminal. Therefore, it is possible to grasp how the transmitted voice signal or video signal has been recognized by a user of the other terminal. Further, because this terminal transmits another response information specifying a voice signal or a video signal received from the other terminal to the other terminal, it is possible to notify how the voice or video received from a user of the other terminal has been recognized by a user of this terminal. Therefore, according to this terminal, it is possible to ensure smooth communication with a user of the other terminal.

A program for a terminal according to one aspect of the invention causes the terminal to function as a signal transmitting unit to transmit a transmission signal being a voice signal or a video signal to an other terminal, an acquisition unit to acquire response information specifying an arrival signal being a signal received by the other terminal among the transmission signal from the other terminal, a specifying unit to specify the arrival signal or a lost signal being a signal not received by the other terminal among the transmission signal based on the transmission signal and the response information, a display unit to display reception status identification information capable of identifying the arrival signal or the lost signal, and a response unit to transmit another response information specifying a voice signal or a video signal received from the other terminal to the other terminal.

Advantageous Effects of Invention

According to one aspect of the present invention, it is possible to ensure smooth communication between a user of a transmitting terminal and a user of a receiving terminal.

BRIEF DESCRIPTION OF DRAWINGS

FIG. 8 is a diagram showing a configuration of a communication control program and a program for a terminal according to the embodiment.

DESCRIPTION OF EMBODIMENTS

Embodiments of the present invention are described hereinafter in detail with reference to the appended drawings. Note that, in the description of the drawings, the same or equivalent elements are denoted by the same reference symbols, and the redundant explanation thereof is omitted.

Generally in video calls between a plurality of terminals through a communication line, a video of a user of a terminal at the other end is displayed on a display unit of each terminal, and a voice uttered by the user of the terminal at the other end is output from a speaker of each terminal. When the voice signal or the video signal transmitted from the transmitting terminal to the receiving terminal is lost due to a failure in the communication line or the like, the video or voice can be interrupted at the receiving terminal. In this case, the user of the transmitting terminal cannot grasp which part of the user's video or voice has reached the receiving terminal, and therefore it is necessary to retransmit the video or voice including the part that has reached the receiving terminal in some cases.

To address the above issue, in a communication control system 1, a reception status of voice signals or video signals from a transmitting terminal at a receiving terminal is displayed on a display unit of the transmitting terminal. The communication control system 1 having such a function is described hereinafter in detail.

The communication control system 1 is a computer system that implements communications between a transmitting terminal and a receiving terminal through a communication line. The communication control system 1 can be used for voice calls or video calls through a communication line, for example.

Figure 1:
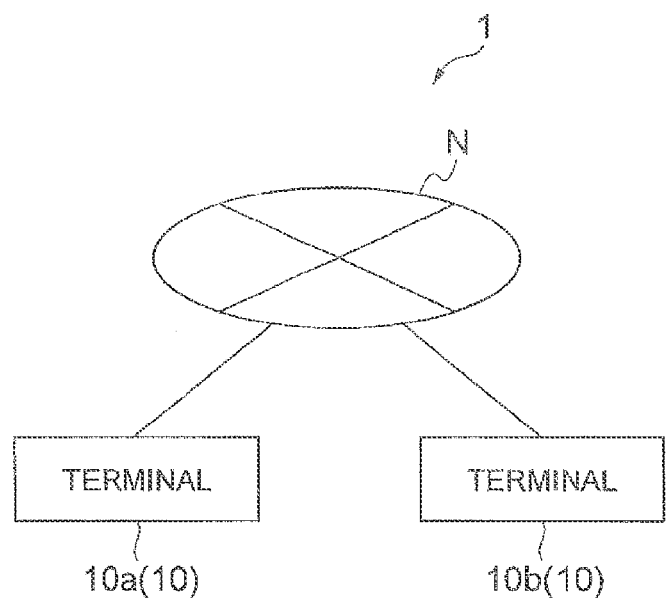
FIG. 1 is a diagram showing an overall configuration of a communication control system according to an embodiment.

FIG. 1 is a diagram showing an overall configuration of the communication control system according to one embodiment. The communication control system 1 is composed of a terminal (transmitting terminal) 10a and a terminal (receiving terminal) 10b connected with each other through a network N. Hereinafter, when there is no need to distinguish between the terminal 10a and the terminal 10b, the terminal 10a and the terminal 10b are referred to collectively as the terminal 10. The network N is a wired or wireless public network or private network, for example. Although two terminals 10 are connected to the network N in FIG. 1, the number of terminals is not limited as long as a plurality of terminals 10 are connected.

Hereinafter, the terminal 10 according to one embodiment is described, and further the configuration of the system 1 according to one embodiment is described. The terminal 10a and the terminal 10b are communication terminals that transmit and receive voice signals or video signals generated based on the voice or action input by each user to and from each other. The terminal that transmits the voice signals or video signals is referred to as a transmitting terminal, and the terminal that receives the voice signals or video signals from the transmitting terminal is referred to as a receiving terminal. Note that the terminals 10a and 10b have the same functional elements and can serve both as the receiving terminal and the transmitting terminal. The terminal 10 may be a portable or stationary personal computer or various types of portable terminals, for example, though the variety of the communication terminal is not limited.

Figure 2:
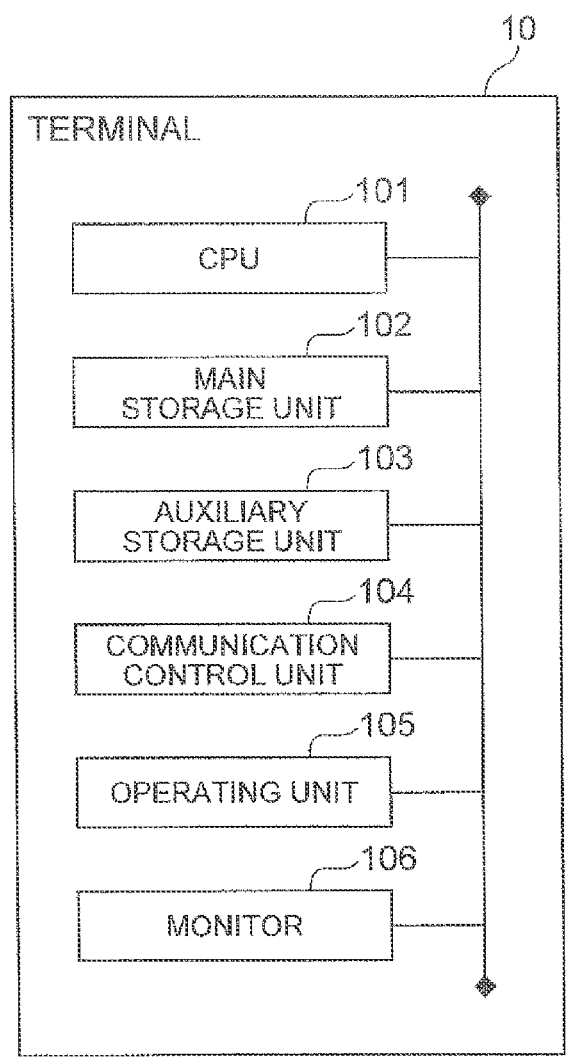
FIG. 2 is a diagram showing a hardware configuration of a terminal according to an embodiment.

As shown in FIG. 2, the terminal 10 is composed of a CPU 101 that executes an operating system, an application program and the like, a main storage unit 102 such as ROM and RAM, an auxiliary storage unit 103 such as memory, a communication control unit 104 that performs data communications through the network N, an operating unit 105 with keys for character and numeric input or instruction of execution, and a monitor 106 such as a liquid crystal display device. The functions of the terminal 10 are implemented by loading given software onto the CPU 101 and the main storage unit 102, making the communication control unit 104 operate under control of the CPU 101, and performing reading and writing of data in the main storage unit 102 or the auxiliary storage unit 103.

Figure 3:
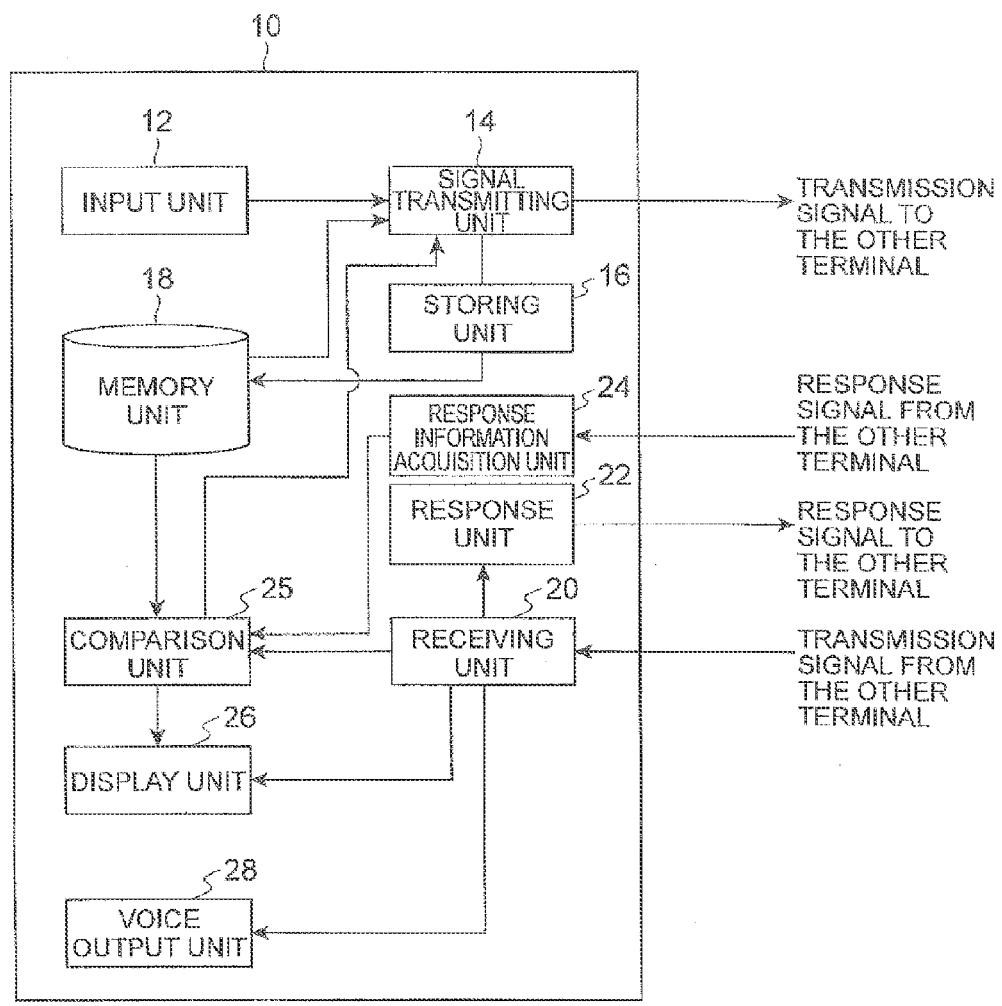
FIG. 3 is a diagram showing a functional configuration of the communication control system according to the embodiment.

FIG. 3 is a block diagram showing a functional configuration of the terminal 10 according to one embodiment. As shown in FIG. 1, the terminal 10 includes an input unit 12, a signal transmitting unit 14, a storing unit 16, a memory unit 18, a receiving unit 20, a response unit 22, a response information acquisition unit 24, a comparison unit (specifying unit) 25, a display unit 26, and a voice output unit 28.

The input unit 12 is a functional element that generates a voice signal or video signal from a voice or action input by a user of the terminal 10a. The input unit 12 is a microphone, camera or the like, for example, and converts the collected voice or action into the voice signal or video signal. The voice signal is a voice waveform representing the voice of a user collected by a microphone, for example. The video signal is video data composed of temporally successive frame images captured by a camera, for example. Hereinafter, the voice signal and video signal are referred to collectively as a transmission signal. In one embodiment, the input unit 12 may encode the transmission signal and output it to the signal transmitting unit 14.

The signal transmitting unit 14 receives the transmission signal from the input unit 12 and then transmits the transmission signal to the other terminal, which is the receiving terminal. Further, the signal transmitting unit 14 outputs the transmission signal transmitted toward the receiving terminal to the storing unit 16. The storing unit 16 stores the transmission signal transmitted toward the receiving terminal into the memory unit 18. In one embodiment, the storing unit 16 may include a voice recognition processing unit so that it converts the voice signal from the signal transmitting unit 14 into a character string by voice recognition processing and stores the voice signal and the character string in association with each other. The memory unit 18 stores the transmission signal transmitted from the signal transmitting unit 14 to the other terminal. In one embodiment, the memory unit 18 may store a terminal to which the signal is to be transmitted and a transmission start time in association with the transmission signal.

The receiving unit 20 is a functional element that receives the transmission signal transmitted from the other terminal, which is the transmitting terminal. Out of the transmission signal transmitted from the transmitting terminal, the receiving unit 20 outputs the video signal to the display unit 26 and outputs the voice signal to the voice output unit 28. In one embodiment, the receiving unit 20 may decode the voice signal or video signal from the transmitting terminal and output the signals to the display unit 26 and the voice output unit 28, respectively. The display unit 26 is a display, for example, and displays a video according to the video signal from the receiving unit 20. The voice output unit 28 is a speaker, for example, and outputs a voice according to the voice signal received by the receiving unit 20.

Further, when the receiving unit 20 receives the transmission signal from the transmitting terminal, it outputs the transmission signal to the response unit 22. The response unit 22 is a functional element that transmits response information that specifies an arrival signal, which is the signal transmitted from the transmitting terminal and received at the receiving terminal, to the transmitting terminal. In other words, the response information is information indicating the reception status at the receiving terminal of the transmission signal transmitted from the transmitting terminal. In one embodiment, the response unit 22 may transmit the received voice signal or video signal back to the transmitting terminal as it is. In this case, the voice signal or video signal that is transmitted back serves as the response information.

Further, the response unit 22 may transmit information that can specify the voice signal or video signal received by the receiving terminal without transmitting the actual voice signal or video signal back. For example, the response unit 22 may transmit a frame number of the frame image received by the receiving terminal among the frame images contained in the video signal. In this case, the frame number serves as the response information. By transmitting a frame number as the response information, the data size of the response information to be transmitted can be reduced in comparison with the case of transmitting the actual video signal. Further, the response unit 22 may transmit a packet number contained in the voice signal or video signal. In this case, the packet number serves as the response information. In this case also, the data size of the response information to be transmitted can be reduced in comparison with the case of transmitting the actual voice signal or video signal. Note that the response information may contain a transmission start time of the received transmission signal.

The response information acquisition unit 24 is a functional element that acquires the response information from the receiving terminal. The response information acquisition unit 24 outputs the response information acquired from the receiving terminal to the comparison unit 25.

The comparison unit 25 is a functional element that specifies the arrival signal or a lost signal, which is a signal not received by the receiving terminal among the transmission signal, based on the transmission signal and the response information, which is one example of a functional element corresponding to the specifying unit in Claims below. The comparison unit 25 receives the response information from the response information acquisition unit 24 and extracts the transmission signal corresponding to the response information from the memory unit 18 by referring to the terminal to which the transmission signal is transmitted and the transmission start time, for example. The comparison unit 25 then compares the extracted transmission signal with the response information and thereby extracts a part of the transmission signal that has been transmitted from the transmitting terminal but has not reached the receiving terminal as the lost signal. The comparison unit 25 generates reception status information capable of identifying the arrival signal or the lost signal and outputs it to the display unit 26. The display unit 26 displays the reception status identification information together with the video according to the video signal from the receiving unit 20. Note that the comparison unit 25 may specify the arrival signal based only on the response information without making comparison between the transmission signal and the response information. Further, the comparison unit 25 may specify the arrival signal or the lost signal based on a difference between the transmission signal and the response information.

Figure 4:
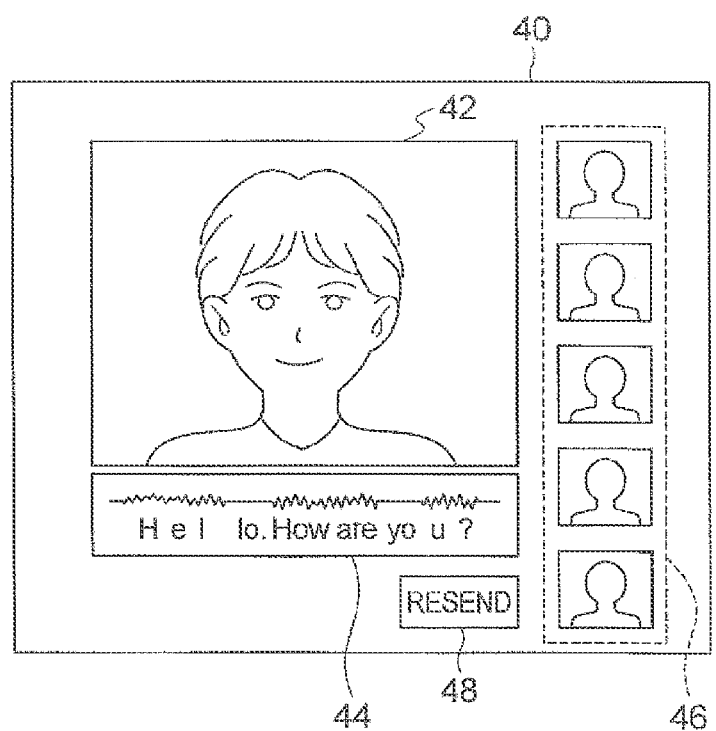
FIG. 4 is a diagram showing one example of a screen displayed on a display unit of the terminal.

The function of the comparison unit 25 and the display screen of the display unit 26 are described in detail with reference to FIGS. 4 to 6. FIG. 4 is a diagram showing an example of a screen displayed on the display unit 26 of the terminal 10 serving as the transmitting terminal. In a screen 40 displayed on the display unit 26, a video display area 42, a voice reception status display area 44, a video reception status display area 46, and a resend button 48 are included. In the video display area 42, a video according to the video signal from the terminal 10 at the other end received by the receiving unit 20 is displayed. For example, a video of a user of the other terminal 10 at the other end of the call is displayed in the video display area 42.

In the voice reception status display area 44, voice reception status identification information indicating the reception status of a voice signal at the receiving terminal is displayed. The voice reception status identification information is the reception status identification information for a voice. The voice reception status identification information contains a voice waveform and a recognized character string corresponding to the transmission signal. A method of generating the voice reception status identification information by the comparison unit 25 is described hereinafter. It is assumed in this example that a voice waveform is stored in the memory unit 18 of the transmitting terminal, and the response information acquisition unit 24 of the transmitting terminal acquires a voice waveform from the receiving terminal as the response information.

The comparison unit 25 compares the voice waveform stored in the memory unit 18 with the voice waveform acquired by the response information acquisition unit 24 and thereby specifies a part where they match and a part where they do not match. The matching part is a part with no loss, and the mismatching part is a lost part where the transmission signal is lost. Then, the comparison unit 25 generates a voice waveform that does not have the amplitude at the lost part and has the waveform corresponding to the transmission signal at the part other than the lost part, and displays the voice waveform in the voice reception status display area 44. In one embodiment, the comparison unit 25 may acquire the character string stored in the memory unit 18 and display the character string in the voice reception status display area 44. In the example of the screen display shown in FIG. 4, a recognized character string is displayed in association with the voice waveform in the voice reception status display area 44. This example shows that, in the recognized character string "Hello. How are you?", the signals corresponding to the part "lo" and "yo" are the lost signals that have not been received by the receiving terminal. Such voice reception status identification information is the reception status identification information that can identify the arrival signal corresponding to the part of the transmission signal with no loss and the lost signal corresponding to the lost part of the transmission signal. With the reception status identification information, a user of the transmitting terminal can grasp which part of the input voice has been received at the receiving terminal.

Note that the comparison unit 25 may generate a voice waveform that represents the lost part using a thin line and represents a part other than the lost part using a heavy line, or generate a voice waveform that represents the lost part and a part other than the lost part by different colors.

Figure 5:
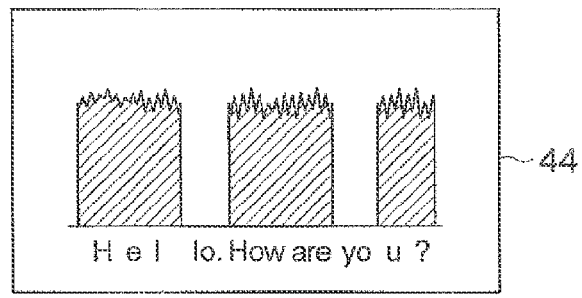
FIG. 5 is a diagram showing another example of the screen displayed on the display unit of the terminal.

Further, in the voice reception status display area 44, the volume of the voice signal that has reached the receiving terminal, not the voice waveform, may be displayed as shown in FIG. 5. The example shown in FIG. 5 shows that, in the volume of the voice signal, a part with no amplitude corresponds to the lost signal.

In the video reception status display area 46, information indicating the reception status of the video signal at the receiving terminal is displayed. In one embodiment, in the video reception status display area 46, frame images of the video (arrival video signal) that has reached the receiving terminal are sequentially displayed in chronological order. The frame images displayed in the video reception status display area 46 are the reception status identification information that can identify the arrival signal corresponding to the part of the transmission signal with no loss and the lost signal corresponding to the lost part of the transmission signal. With the reception status identification information, a user of the transmitting terminal can grasp which part of the input action has been received at the receiving terminal.

The resend button 48 is a button for resending the lost signal corresponding to the lost part of the transmission signal extracted by the comparison unit 25. When a user selects the resend button 48 by an operating means such as a mouse or a touch panel, the comparison unit 25 outputs the lost signal to the signal transmitting unit 14, and the signal transmitting unit 14 transmits the lost signal to the receiving terminal. In this case, the signal transmitting unit 14 is equivalent of a retransmitting unit that retransmits the lost signal to the receiving terminal in response to a request from a user of the transmitting terminal.

Figure 6:
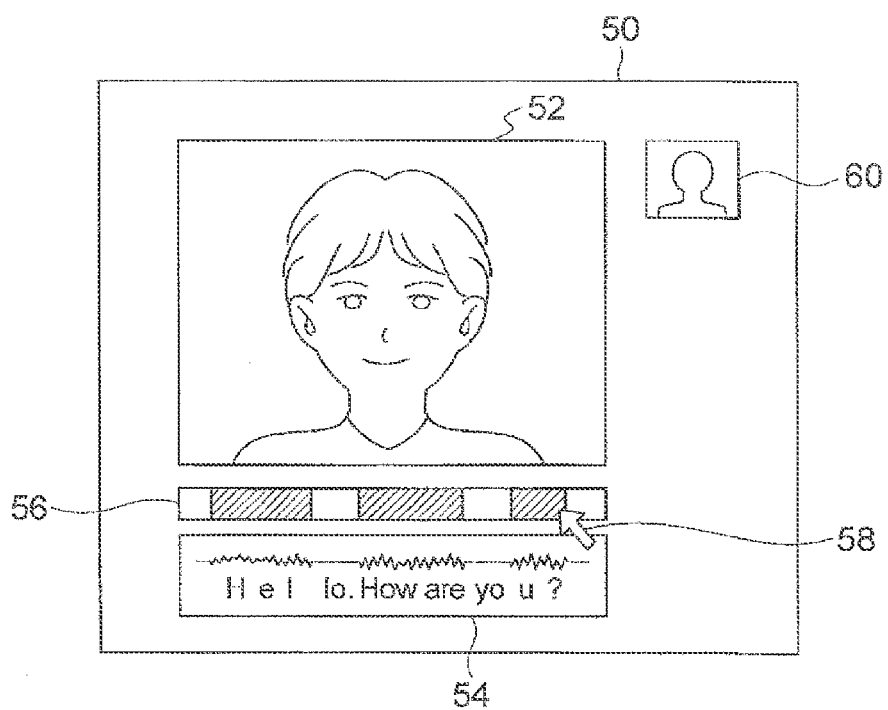
FIG. 6 is a diagram showing another example of the screen displayed on the display unit of the terminal.

FIG. 6 is a diagram showing another example of a screen displayed on the display unit 26 of the terminal 10 serving as the transmitting terminal. In a screen 50 displayed on the display unit 26, a video display area 52, a voice reception status display area 54, a video reception status display bar 56, and a video reception status display area 60 are included. The display contents of the video display area 52 and the voice reception status display area 54 are respectively the same as those of the video display area 42 and the voice reception status display area 44 in FIG. 4.

The video reception status display bar 56 is information representing the time base of the video signal. In the video reception status display bar 56, a part other than the lost part and the lost part are represented by different color tones, for example, so that the lost part is recognizable. A user places a cursor 58 at a specified position on the video reception status display bar 56 and can thereby indicate a time corresponding to the position. The video reception status display bar 56 functions as a time acquisition unit that acquires a time indicated by the user. In one embodiment, when a user places the cursor at a part other than the lost part on the video reception status display bar 56, the frame image corresponding to the time is displayed in the video reception status display area 60. On the other hand, when a user places the cursor at the lost part on the video reception status display bar 56, the frame image may not be displayed in the video reception status display area 60. A user of the terminal 10 at the transmitting end can thereby easily grasp the frame image that has not reached the terminal 10 at the receiving end.

Figure 7:
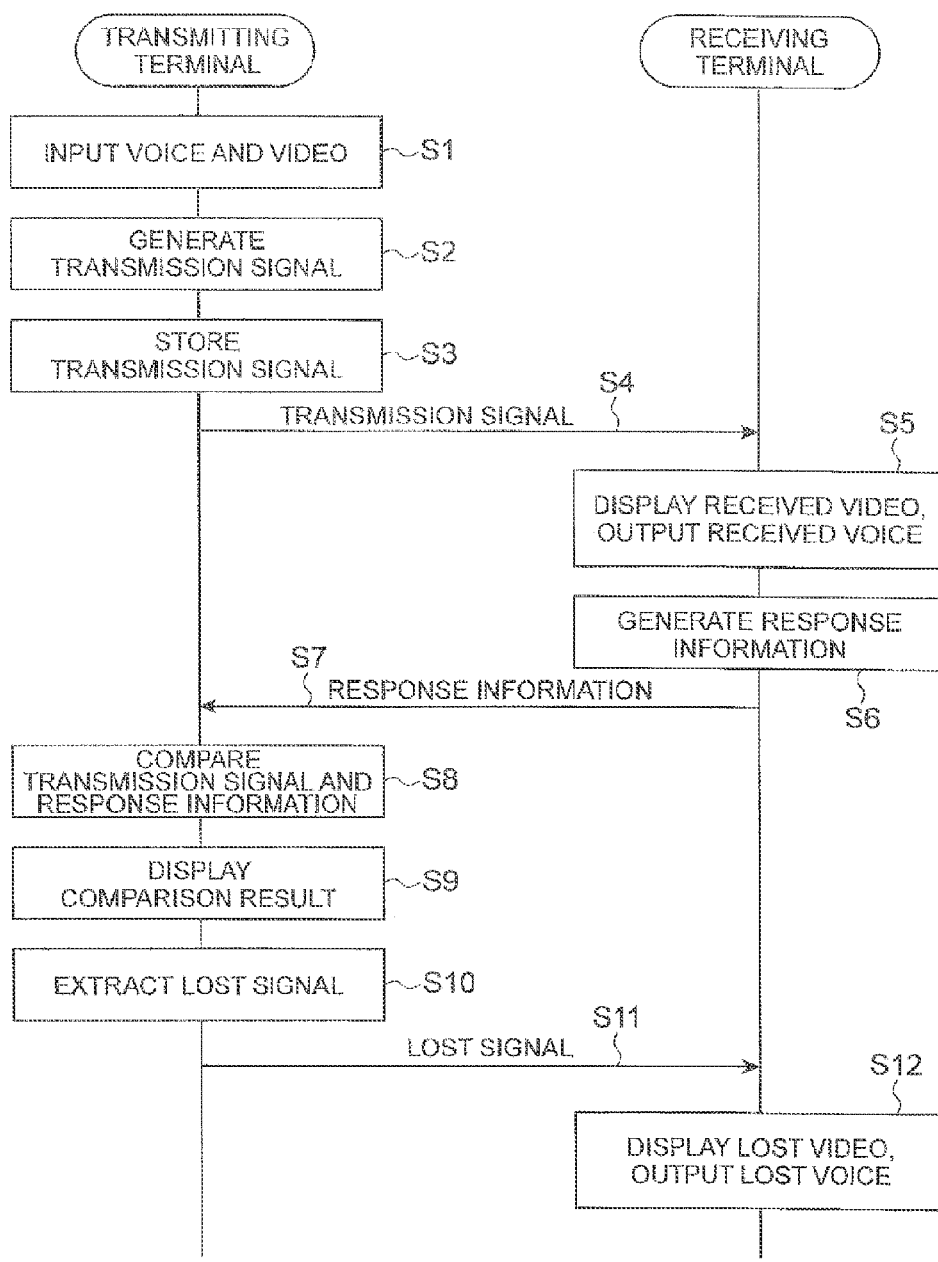
FIG. 7 is a sequence chart showing an operation of the communication control system according to the embodiment.

An operation of the communication control system 1 shown in FIG. 1 is described, and further a communication control method according to one embodiment is described with reference to FIG. 7. FIG. 7 is a sequence chart showing an operation of the communication control system 1. In the following description, the terminal 10a is the transmitting terminal that transmits the transmission signal and the terminal 10b is the receiving terminal that receives the transmission signal.

First, a voice or action is input to the input unit 12 of the terminal 10a by a user of the terminal 10a (Step S1), and the input unit 12 generates a transmission signal according to the input voice or action (Step S2). Next, the signal transmitting unit 14 stores the transmission signal into the memory unit 18 through the storing unit 16 (Step S3) and then transmits the transmission signal to the terminal 10b (Step S4).

The terminal 10b receives the transmission signal from the terminal 10a, outputs the voice according to the voice signal from the voice output unit 28 and displays the video according to the video signal on the display unit 26 (Step S5). After that, the response unit 22 of the terminal 10b generates response information that specifies the transmission signal received from the terminal 10a (Step S6) and transmits the response information to the terminal 10a (Step S7).

Then, the comparison unit 25 of the terminal 10a compares the transmission signal stored in the memory unit 18 with the response information (Step S8) and displays the reception status identification information, which is a result of the comparison, on the display unit 26 (Step S9). In one embodiment, the comparison unit 25 of the terminal 10a compares the lost part stored in the memory unit 18 with the response information and extracts the lost signal corresponding to the lost part of the transmission signal (Step S10) and transmits the lost signal to the terminal 10b (Step S11). The terminal 10b outputs the voice according to the lost signal from the voice output unit 28 and displays the video according to the lost signal on the display unit 26 (Step S12).

In one embodiment, the terminal 10a may calculate the level of importance of the lost signal in Step S10 and, when the level of importance is lower than a reference value, may refrain from retransmitting the lost signal to the receiving terminal. The level of importance of the lost signal is a value determined from the viewpoint as to whether information corresponding to the lost signal is important information in the call. For example, the terminal 10a may refrain from retransmitting the lost signal when the number of characters of the voice corresponding to the lost part is a specified number (for example, 5) or less, and retransmit the lost signal when the number of characters of the voice corresponding to the lost part is more than the specified number (for example, 5). This is because, when the number of characters of the lost voice is small, it is assumed that a user of the terminal 10b can understand the content of the transmitted voice without transmission of the lost signal. Further, in one embodiment, even if the number of characters of the voice corresponding to the lost part is a specified number (for example, 5) or less, the lost signal corresponding to the lost part may be transmitted if the character string relates to a numeric value or a place. This is because a numeric value or a place is considered to be important information. Note that whether the character string relates to a numeric value or a place may be determined by analyzing the sentence structure of the character string.

Further, in one embodiment, the terminal 10a may refrain from retransmitting the lost signal when the duration of the voice or video corresponding to the lost part is a specified time length or shorter, and retransmit the lost signal when the duration of the voice or video corresponding to the lost part is longer than the specified time length.

In another embodiment, the terminal 10a may refrain from retransmitting the lost signal when the volume of the voice corresponding to the lost part is a specified volume or less, and retransmit the lost signal when the volume of the voice corresponding to the lost part is more than the specified volume. Further, in another embodiment, the terminal 10a may determine whether or not to retransmit the lost signal according to the terminal to which the lost signal is to be transmitted.

Further, the terminal 10a may set a specified section including the lost signal to the transmission signal based on the lost signal or the transmission signal, and retransmit the signal within the specified section to the receiving terminal. For example, when information lost by the lost signal is a word, the terminal 10a may set a sentence or a paragraph including the lost word as the section to be retransmitted and retransmit the section. This is because, if only the word is transmitted to the terminal 10b, there is a possibility that a user of the terminal 10b has difficulty in understanding what the retransmitted information means. As a specific example, when the voice corresponding to the transmission signal is "The next meeting is March 8. The place is at the boardroom A" and the voices of "8" and "boardroom A" are lost, the terminal 10a may retransmit the whole sentence of "The next meeting is March 8. The place is at the boardroom A". In another embodiment, the terminal 10a may set a part where the amplitude of the voice waveform including the lost signal is continuous as the section to be retransmitted and retransmit the section. Further, the terminal 10a may convert the lost signal into a character string by voice recognition processing and transmit the character string to the terminal 10b. A user of the receiving terminal can thereby easily grasp the content of the lost part.

A communication control program and a program for a terminal that cause a computer (a terminal, for example) to execute the above-described processing are described hereinafter with reference to FIG. 8. FIG. 8 is a diagram showing a configuration of the communication control program according to one embodiment. Note that, by applying the program to a terminal, the terminal can operate as the terminal 10 having the above functions.

The communication control program P1 includes a main module P2, an input module P3, a signal transmitting module P4, a storing module P5, a memory module P6, a receiving module P7, a response module P8, a response information acquisition module P9, a comparison module P10, a display module P11, and a voice display module P12.

The main module P2 is a part that exercises control over communications. The functions implemented by executing the main module P2, the input module P3, the signal transmitting module P4, the storing module P5, the memory module P6, the receiving module P7, the response module P8, the response information acquisition module P9, the comparison module P10, the display module P11 and the voice display module P12 are equal to the functions of the input unit 12, the signal transmitting unit 14, the storing unit 16, the memory unit 18, the receiving unit 20, the response unit 22, the response information acquisition unit 24, the comparison unit 25, the display unit 26 and the voice output unit 28 described above, respectively.

The communication control program P1 is provided in the form of being recorded on a tangible recording medium such as CD-ROM, DVD-ROM or semiconductor memory, for example. Further, the communication control program P1 may be provided as a data signal superimposed onto a carrier wave through the network N.

As described above, in the communication control system 1 according to one embodiment, the transmission signal transmitted from the terminal 10a and the response information transmitted from the terminal 10b are compared, and a result of the comparison is displayed on the display unit of the terminal 10a. A user of the terminal 10a can thereby grasp how the transmitted voice signal or video signal has been recognized by a user of the terminal 10b. Therefore, according to this communication control system, it is possible to ensure smooth communication between a user of the terminal 10a and a user of the terminal 10b.

Further, in the communication control system 1, because the character string by voice recognition processing is displayed in association with the voice waveform, it is possible to easily grasp the lost voice among the voice transmitted from the terminal 10 at the transmitting end. Further, in the communication control system 1, because the lost signal that has been transmitted from the transmitting terminal and not received by the receiving terminal is transmitted to the receiving terminal, it is possible to enhance smooth communication between users of a plurality of terminals.

In addition, in the communication control system 1, because whether or not to transmit the lost signal to the receiving terminal is determined depending on the level of importance of the lost part, it is possible to prevent transmission of the lost signal that is less important.

Hereinbefore, the present invention has been described in detail with respect to the embodiment thereof. However, the present invention is not limited to the above-described embodiment. Various changes and modifications may be made therein without departing from the scope of the invention.

For example, although the terminal 10a includes the input unit 12, the signal transmitting unit 14, the storing unit 16, the memory unit 18, the receiving unit 20, the response unit 22, the response information acquisition unit 24, the comparison unit 25, the display unit 26 and the voice output unit 28 as described above, some of those functional elements may be included in a server disposed separately from the terminal 10.

Further, although the communication control system 1 makes a video call between the two terminals 10a and 10b in the above embodiment, a multi-party video call may be made among three or more terminals. In this case, on the display unit 26 of the terminal 10 at the transmitting end, the reception status identification information from two or more terminals are displayed. At this time, the reception status identification information of the terminal with poor line quality and in which many losses occur in the transmission signal, for example, may be displayed preferentially.

Further, in the case of retransmitting the lost signal, a message notifying pause of a voice or video call may be displayed on the display unit, and the voice or video call may be resumed after the retransmission of the lost signal is completed. Note that, although one-way communication where a voice signal or a video signal is transmitted from the terminal 10a as the transmitting terminal to the terminal 10b as the receiving terminal is described mainly in the above embodiment, the present invention is applicable also to two-way communication where a voice signal or a video signal is transmitted and received between the terminal 10a and the terminal 10b.

REFERENCE SIGNS LIST

1 . . . communication control system, 10,10a,10b . . . terminal, 12 . . . input unit, 14 . . . signal transmitting unit, 16 . . . storing unit, 18 . . . memory unit, 20 . . . receiving unit, 22 . . . response unit, 24 . . . response information acquisition unit, 25 . . . comparison unit, 26 . . . display unit, 28 . . . voice output unit, N . . . network, P1 . . . information providing program, P1 . . . communication control program, P10 . . . comparison module, P11 . . . display module, P12 . . . voice display module, P2 . . . main module, P3 . . . input module, P4 . . . signal transmitting module, P5 . . . storing module, P6 . . . memory module, P7 . . . receiving module, P8 . . . response module, P9 . . . response information acquisition module

The invention claimed is:
1. A terminal comprising:
a signal transmitting unit configured to transmit a transmission signal containing at least one of a voice signal and a video signal to an other terminal;
a storing unit configured to store the transmission signal in association with information indicating each part of the transmission signal into a memory unit;
an acquisition unit configured to acquire response information indicating an arrival part of the transmission signal received by the other terminal among the transmission signal from the other terminal; and a display unit configured to display information transmitted by the transmission signal in chronological order in such a way that a lost part of the transmission signal not received by the other terminal among the transmission signal is identifiable based on the information indicating each part of the transmission signal and the response information.

2. The terminal according to claim 1, wherein
when the transmission signal contains the voice signal, the display unit displays a character string generated from the voice signal.

3. The terminal according to claim 1, wherein
when the transmission signal contains the video signal, the display unit displays frame images generated from the video signal in chronological order.

4. The terminal according to claim 3, wherein
when a time is indicated by a user of the terminal, the display unit displays a frame image of the video signal corresponding to the time.

5. The terminal according to claim 1, wherein
the signal transmitting unit retransmits the lost part of the signal to the other terminal.

6. The terminal according to claim 5, further comprising:
an importance calculation unit configured to calculate a level of importance of the lost part based on at least one of a volume and content of information transmitted by the lost part of the signal, wherein
the signal transmitting unit does not retransmit the lost part of the signal to the other terminal when the level of importance is lower than a reference value.

7. The terminal according to claim 5, wherein
the signal transmitting unit retransmits a signal within a specified section including the lost part to the other terminal.

8. The terminal according to claim 5, wherein
when the transmission signal contains the voice signal, a character string generated from the lost part of the voice signal is transmitted to the other terminal.

9. The terminal according to claim 5, wherein
the signal transmitting unit retransmits the lost part of the signal to the other terminal when requested by a user of the terminal.

10. A communication control method by a terminal that communicates with an other terminal, comprising:
transmitting a transmission signal containing at least one of a voice signal and a video signal to the other terminal;
storing the transmission signal in association with information indicating each part of the transmission signal into a memory unit;
acquiring response information indicating an arrival part of the transmission signal received by the other terminal among the transmission signal from the other terminal; and
displaying information transmitted by the transmission signal in chronological order in such a way that a lost part of the transmission signal not received by the other terminal among the transmission signal is identifiable based on the information indicating each part of the transmission signal and the response information.

11. A non-transitory computer readable medium having a program for a terminal causing the terminal to:
transmit a transmission signal containing at least one of a voice signal and a video signal to an other terminal;
store the transmission signal in association with information indicating each part of the transmission signal into a memory unit;
acquire response information indicating an arrival part of the transmission signal received by the other terminal among the transmission signal from the other terminal; and
display information transmitted by the transmission signal in chronological order in such a way that a lost part of the transmission signal not received by the other terminal among the transmission signal is identifiable based on the information indicating each part of the transmission signal and the response information.

12. The terminal according to claim 2, wherein
the signal transmitting unit retransmits the lost part of the signal to the other terminal.

13. The terminal according to claim 12, further comprising:
an importance calculation unit configured to calculate a level of importance of the lost part based on at least one of a volume and content of information transmitted by the lost part of the signal, wherein
the signal transmitting unit does not retransmit the lost part of the signal to the other terminal when the level of importance is lower than a reference value.

14. The terminal according to claim 12, wherein
when the transmission signal contains the voice signal, a character string generated from the lost part of the voice signal is transmitted to the other terminal.

15. The terminal according to claim 3, wherein
the signal transmitting unit retransmits the lost part of the signal to the other terminal.

16. The terminal according to claim 15, further comprising:
an importance calculation unit configured to calculate a level of importance of the lost part based on at least one of a volume and content of information transmitted by the lost part of the signal, wherein
the signal transmitting unit does not retransmit the lost part of the signal to the other terminal when the level of importance is lower than a reference value.

17. The terminal according to claim 15, wherein
when the transmission signal contains the voice signal, a character string generated from the lost part of the voice signal is transmitted to the other terminal.

18. The terminal according to claim 4, wherein
the signal transmitting unit retransmits the lost part of the signal to the other terminal.

19. The terminal according to claim 18, further comprising:
an importance calculation unit configured to calculate a level of importance of the lost part based on at least one of a volume and content of information transmitted by the lost part of the signal, wherein
the signal transmitting unit does not retransmit the lost part of the signal to the other terminal when the level of importance is lower than a reference value.

20. The terminal according to claim 18, wherein
when the transmission signal contains the voice signal, a character string generated from the lost part of the voice signal is transmitted to the other terminal.

* * * * *